(12) United States Patent
Decker et al.

(10) Patent No.: US 9,135,311 B2
(45) Date of Patent: Sep. 15, 2015

(54) GATHERING AND CONTRIBUTING CONTENT ACROSS DIVERSE SOURCES

(71) Applicant: Kawf.com, Inc., Redmond, WA (US)

(72) Inventors: Joshua E. Decker, Redmond, WA (US); Sean Michael Sperte, Kirkland, WA (US); Timothy D. Shimotakahara, Bellevue, WA (US)

(73) Assignee: Tagboard, Inc., Redmond, WA (US)

( * ) Notice: Subject to any disclaimer, the term of this patent is extended or adjusted under 35 U.S.C. 154(b) by 288 days.

(21) Appl. No.: 13/837,829

(22) Filed: Mar. 15, 2013

(65) Prior Publication Data

US 2013/0254231 A1 Sep. 26, 2013

Related U.S. Application Data

(60) Provisional application No. 61/613,411, filed on Mar. 20, 2012.

(51) Int. Cl.
*G06F 17/30* (2006.01)
(52) U.S. Cl.
CPC .... *G06F 17/30545* (2013.01); *G06F 17/30864* (2013.01)
(58) Field of Classification Search
None
See application file for complete search history.

(56) References Cited

U.S. PATENT DOCUMENTS

| | | | | |
|---|---|---|---|---|
| 6,643,006 | B1 * | 11/2003 | Hsu et al. | 356/237.2 |
| 2009/0063538 | A1 * | 3/2009 | Chitrapura et al. | 707/102 |
| 2011/0106642 | A1 * | 5/2011 | Hassan et al. | 705/26.3 |
| 2011/0191394 | A1 * | 8/2011 | Winteregg et al. | 707/822 |

\* cited by examiner

*Primary Examiner* — Wilson Lee
(74) *Attorney, Agent, or Firm* — Christensen O'Connor Johnson Kindness PLLC

(57) ABSTRACT

A content unification system is described herein that aligns related content from various sources into one unified stream. The system leverages tagging (e.g., hashtags or other added metadata associated with content) to filter and connect related content across sites, formats, and sources. One component of the system is a user-friendly and customizable "dash board" view of the various topics, called a "tagboard". Tagboards can be quickly and easily created by users and can be embedded on any website. Users can interact with various content sources such as blogs, forums, or services without leaving the tagboard they are viewing. The content unification system provides users the tools to make the web efficient, increase user interaction, and increase the signal to noise ratio. The system also allows site owners and publishers to monetize their traffic better by directing advertisements to their content in real time.

15 Claims, 4 Drawing Sheets

GATHERING AND CONTRIBUTING CONTENT ACROSS DIVERSE SOURCES

CROSS-REFERENCE TO RELATED APPLICATIONS

The present application claims the benefit of U.S. Provisional Patent Application No. 61/613,411 entitled "GATHERING AND CONTRIBUTING CONTENT ACROSS DIVERSE SOURCES," and filed on 2012 Mar. 20, which is hereby incorporated by reference.

BACKGROUND

The Internet is filled with many types of content, including text, images, videos, audio, e-books, and so forth. These types of content may combine to make conversations and data exchanged between various users of the Internet. Content may comprise news articles, discussion boards, product sales information, e-commerce data, personal information, educational information, software as a service (SaaS) applications, and so forth. For example, a news website may include articles that use text, images, and videos to convey current information, while a discussion board may include text and graphical data associated with conversations between users.

Content may come from a variety of sources, including user-generated content, professionally generated content (e.g., from a news site editor), academic or other sources, corporate messaging, and so forth. User generated content may include text-based conversations between users on sites such as Facebook, Twitter, any message board, e-mail, and so on as well as graphical and other content created by users, such as photos posted to a social networking website, illustrations of problems posted to a question and answer site, and so forth.

Content often has some form of organization that is proprietary and native to a particular site. For example, a news site may publish articles in its own format that differs from that of other news sites. Such sites may include some common, standardized way of extracting information, such as Really Simple Syndication (RSS), XML/JSON feeds, and application programming interfaces (APIs), but such facilities often do not display content in the same form as the original and may miss information that is not deliberately exposed in this way. Other sites, such as Facebook, organize photos, biographical data, conversations in their own unique format, such as via a news feed, photo album viewing area, and so forth. Discussion boards may offer yet another format for organization and sharing information, such as hierarchical folders or topics, posts within each topic, and so forth. Each discussion board or site may use its own proprietary format, except where sites elect to leverage the same middleware discussion board software, though there are even many of those.

The Internet has grown exponentially creating an unmanageable and disconnected chaos of data and content. One important piece of this chaos is the discussion that goes on about various topics. These discussions are disconnected from each other by site location, type of discussion, and format. For example, an owner of a particular make and model of car with a problem may ask a question about the problem on any of hundreds of sites. Car enthusiast sites, general knowledge sites (e.g., Wikipedia, E-How, About.com, and so on), and others may all contain the information the owner is looking for or may contain the same question that the owner wants to ask. The owner's success in finding a satisfactory answer may depend on the amount of exposure the question receives which may depend on which site the owner happens to choose. The owner may opt to "broadcast" the question to many sites, hoping someone on one of them will provide a helpful answer. This situation makes it very difficult for users to engage in meaningful discussions because of the difficulty involved in keeping up with these various sources separately.

An interesting development is that users often self-classify their content by using tag or keywords as a means of a taxonomy to organize information. The introduction and adoption of the hashtag (words following a "#" symbol that indicate a classification given to content by the content author) on social media sites often provides a source of classification information embedded within content. Being placed on content by the content author as the content is being created, hashtags form a democratic, non-editorial method of content classification. Other users may also repost content of others and add additional hashtags as a method of flagging an important aspect of the content that the original author did not.

DETAILED DESCRIPTION

A content unification system is described herein that aims to bring this chaos into order, in part by creating order and aligning related content into one unified stream. The system unifies this stream of content by acting like a magnet for content. In some embodiments, the system leverages tagging (e.g., hashtags or other added metadata associated with content) to filter and connect related content across sites, formats, and sources. In some embodiments, one component of the system is a user-friendly and customizable "dash board" view of the various topics, called a "tagboard". Tagboards can be quickly and easily created by users and can be embedded on any website. Using the system, users can interact with, reply to, and send responses to various content sources such as blogs, forums, or services like Twitter without leaving the tagboard they are viewing.

When a user makes a new post to a tagboard, the user adds tags to the post to help target different audiences as appropriate. In some embodiments, the system automates some of this process to help the user. Tags can be about anything, including various topics, feelings, brands, or communities. Users can build their own social network around these different topics, connect with friends and family, and use it as a powerful blogging and sharing tool. Whether a sports team, specific event, brand, or common interest, people can more comprehensively follow and interact with the topics they care about, while publishers and businesses engage with a broader community that is not limited to a particular site or service.

When a user posts to a tagboard, the content may actually be posted to a social network or other site. The system can leverage third-party social networks or other sites for publication, and then store a reference to the post with the system to make the post visible on the tagboard later. This may have a variety of advantages, such as making the content visible even to people that are not users of the tagboard, and relieving the content unification system from carrying the burden of implementing a social network of its own.

The content unification system provides users the tools to make the web efficient, increase user interaction, and increase the signal to noise ratio. The system also allows site owners, publishers, and networks to monetize their traffic better by directing advertisements to their content in real time without the need for Google (or similar sites) to have to periodically crawl their content. The users indicate what they are talking about by "tagging" their post, and the system places advertisements directed at these tags. This results in higher revenue based on a higher click through ratio and better user targeting. Thus, the content unification system helps users, content owners, and third parties by helping each find more of what they are looking for in one place.

Figure 1:
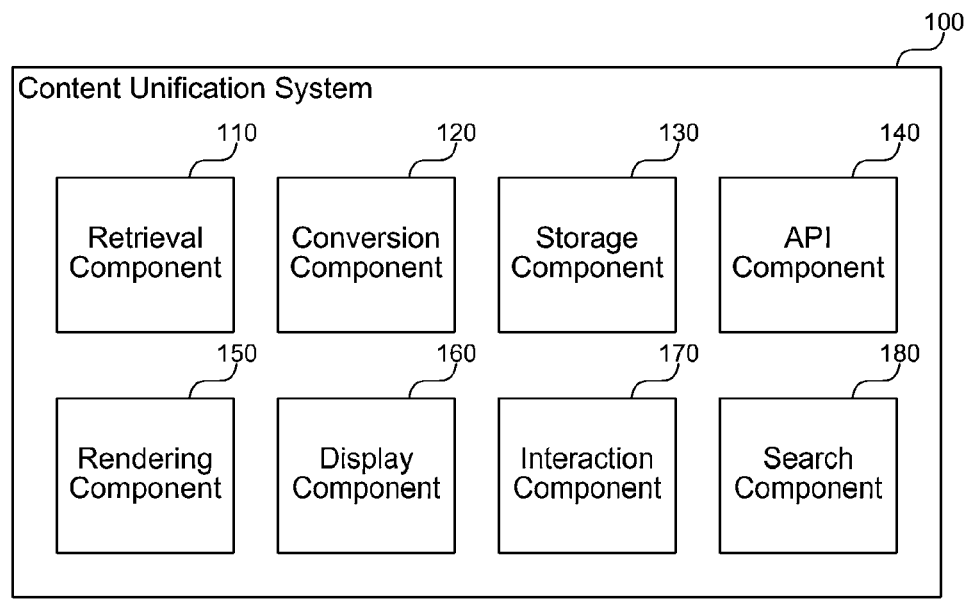
FIG. 1 is a block diagram that illustrates components of the content unification system, in one embodiment.

FIG. 1 is a block diagram that illustrates components of the content unification system, in one embodiment. The system 100 includes a retrieval component 110, a conversion component 120, a storage component 130, an application programming interface (API) component 140, a rendering component 150, a display component 160, an interaction component 170, and a search component 180. Each of these components is described in further detail herein.

The retrieval component 110 accesses user content from one or more data sources over a network. The retrieval component 110 may access one or more websites, RSS feeds, social media streams, or other sources of user content, such as status updates, forum posts, comments, and so forth. In some embodiments, the retrieval component 110 uses a JavaScript Object Notation (JSON) protocol to access user content stored at popular Internet sites, such as Twitter, Facebook, Instagram, and others. The system 100 may be configured with a uniform resource locator (URL) for each data source from which the system 100 can acquire data. The system 100 may use clues provided by users to classify data, such as hashtags, to determine what data to retrieve. For example, the system 100 may retrieve only posts with a particular hashtag.

Retrieval may occur in several ways. In some cases, a user request may prompt the retrieval component 110 to access one or more known services to retrieve a particular set of posts or other user content. In some cases, the system 100 stores data retrieved during one cycle or request, and if a subsequent request arrives within a threshold period after the request, the system 100 may retrieve the stored data instead of accessing the data sources again. For popular requests, the system 100 may proactively and automatically retrieve data from the data sources, even if no user request has been received. In some embodiments, the retrieval component 110 employs a pluggable architecture that allows the addition of software-based data providers that can retrieve and interpret data from new types of data sources. Each data source may provide its own server API from which data can be retrieved, and may provide data in a variety of formats (e.g., text, audio, video, and so on) that the provider can understand.

Data sources vary in their support for data classification mechanisms such as hashtags. Thus, depending on the support of a particular source, the retrieval component 110 may take different actions to retrieve relevant data. For example, if a particular service does not understand or support hashtags, the component 110 may simply retrieve posts and other content as text, and then post-process the content once retrieved to determine which data classification information the content contains. In some cases, the component 110 performs a search on incoming data, whether that data is in text, video, audio, or other forms to locate tagging and other classification information.

In some embodiments, the retrieval component 110 supports the concept of paging, or retrieving data in subsets, referred to as pages, one or more at a time. Thus, the component 110 may retrieve a first set of data and be given an identifier or timestamp by the data source to be able to return and retrieve the next set of data. In some cases, the system 100 may receive a request to find all posts since a particular time, and paging can be used to specify the initial time and then to retrieve however much data is available after that time in manageable chunks.

The conversion component 120 cleans up data retrieved from the one or more data sources, and places the data in a normalized format for the other components of the system 100. The conversion process may remove particular hypertext markup language (HTML), cascading style sheets (CSS), or other information included with the data that may cause the data to render incorrectly or undesirably in the contexts in which the system 100 will render the data. In some embodiments, the system 100 may implement other criteria for cleaning up data, such as employing a bad word engine to remove foul or offensive language, removing formatting that would be bad for displaying the data, and standardizing incoming features from one data source that may be incompatible with incoming data from other data sources. The conversion component 120 may keep some formatting in the incoming data, such as bold, italics, underlining, and other formatting that will convey the proper meaning to users even when displayed in a different environment than where the content was found. The conversion component 120 may also rewrite retrieved content with new formatting suitable for the front end provided by the rendering component 150 of the system 100.

The storage component 130 logically identifies and persists incoming cleaned data retrieved from the one or more data sources in a manner that supports efficient redisplay of the data. The component 130 may logically separate incoming data by data source and by hashtag, or by other criteria useful in a particular implementation of the system 100, including location, or user metadata. The component 130 may use one or more files, file systems, databases, storage area networks (SANs), cloud-based storage services, or other facilities for storing data over time. The storage component 130 prepares data for redisplay according to a variety of criteria. For example, if a user requests to display all content containing a particular hashtag from the data source Twitter during a specified time period, the system 100 is prepared to respond to such a request. The stored data includes metadata that indicates which data source the data was retrieved from, which hashtags or other classifiers were associated with the data, any time period associated with the data (e.g., a post's timestamp), and so forth. The storage component 130 is thus a repository of information from a potentially wide variety of sources all related to a particular topic or data classifier, and is stored in a format that it is ready for unified consumption by a user interface provided by the system 100 or third parties. The storage component 130 may have a similar level of information for many different topics or data classifiers.

In some embodiments, the storage component 130 also stores rendering template information for one or more data classifications. The concept of tagboards is described further herein, and represents a user interface experience that a particular tagboard owner wants to provide for content related to a particular classification. For example, the carmaker Audi may provide a tagboard for all content associated with the hashtag "#Audi" found at various data sources on the Internet. When users visit a web page or other user interface that displays the tagboard, the owner of the tagboard provides a default rendering experience that presents the retrieved data associated with the particular data classification in whatever manner is determined by the tagboard owner. For example, the owner of a particular tagboard may select a grid-based view, with content meeting certain criteria being featured over other content, indicated by sorting the content with the featured content at the top or most prominent position. The rendering template information may include owner information for each tagboard, access permissions for the tagboard, and other information used by the system 100 when rendering and displaying a particular tagboard.

In some embodiments, the storage component 130 implements a cache that makes retrieval of content from data sources more efficient. As described herein, the system 100 may service some retrieval requests by detecting that a previous request has already retrieved the same or similar data, and by then leveraging the response to the previous request to service subsequent requests without going back to the data sources again. The system 100 may determine when to use the cache and when to go back to the original data sources based on a time-based expiration of content in the cache or other method determined by an operator of the system 100. The storage component 130 also includes a cleanup mechanism that removes unneeded or irrelevant data after a set period or at opportune times (e.g., when the system 100 is less busy or idle).

The API component 140 exposes data stored by the storage component 130 programmatically for access by one or more software programs. The API component may provide a JSON, web service, or other programmatic interface that allows a software program to invoke the API to access data stored by the system 100. The API component 140 provides sanitized data retrieved from a variety of sources in a format that is uniform and ready for redisplay in a common user interface, regardless of where the data originated. For example, the API component 140 may receive a specification of a data classification (e.g., a hashtag or other data classifier), and then provide a list or other enumeration of content related to the received data classification. The API component 140 may also provide functions for obtaining more detailed information about any particular content item, for responding or sharing a particular content item, for paging through available content items, and so forth. The API component 140 may also receive any restrictive or filtering information, such as a selection of data sources from which the caller wants to receive data, a date and time range related to the data, and so on.

The rendering component 150 formats the data stored by the storage component 130 and prepares the data for display on a particular device. The rendering component 150 may prepare data for a variety of device types, such as televisions, mobile computing devices, web browsers, and so on. Rendering may include preparing content based on available display space, paginating content to wrap content at an appropriate width, providing controls for scrolling to additional content, and so forth. The rendering component 150 may selectively enable or disable particular formatting that is or is not suitable for a particular device on which the data will be displayed. The component 150 may also modify font sizes or other characteristics of the stored data for a good user experience on the particular device on which the data will be displayed.

The display component 160 includes the hardware and software environment in which the formatted data is displayed on a particular device. For example, a smartphone may display the formatted data on a relatively small screen (e.g., a four or five inch diagonal screen) from within a web browser or a dedicated mobile application. Another user may access the system 100 from a desktop computer, also potentially using a web browser or dedicated application, but with a far larger screen available for displaying the data. Another user may access the system 100 from a television with a large screen, but relatively lower resolution, such that fonts and other details need to be larger to be readable. The display component 160 informs the rendering component 150 of its particular specifications and needs and the rendering component 150 provides content in a format that the display component 160 can readily display.

The interaction component 170 receives user input related to displayed formatted data. Users may select a particular content item to view additional detail, share a content item with other users (e.g., via email, retweet, social network post, blog post, or other mechanism), reply to a content item, and so forth. Users may also interact with a group of content items, such as by scrolling, paging to request more data, changing filtering settings so that different data is included or existing data excluded, change sorting options to modify the order of content items, and so forth. The interaction component 170 receives the user input and invokes the system 100 to provide a result that the user's input specifies or implies. For example, if the user requests filtering out data from one particular data source, then the system 100 may access the storage component 130 to retrieve data not from the excluded data source, then invoke the rendering component 150 to provide the retrieved content to the user's display.

The search component 180 provides a search interface for searching stored and categorized data from multiple data sources. Searches may return data for data classifications that have no owner and have not been customized. For example, a user may search for a hashtag for which no tagboard exists yet. In such cases, the system 100 may allow the user to create a tagboard and take ownership of a web page or other interface associated with the hashtag. For example, the system 100 may place a "create tagboard" button or other control on pages for tagboards that have no owner, and display a default view of the information stored in the storage component 130 for the related data classification.

The computing device on which the content unification system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, tablet computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
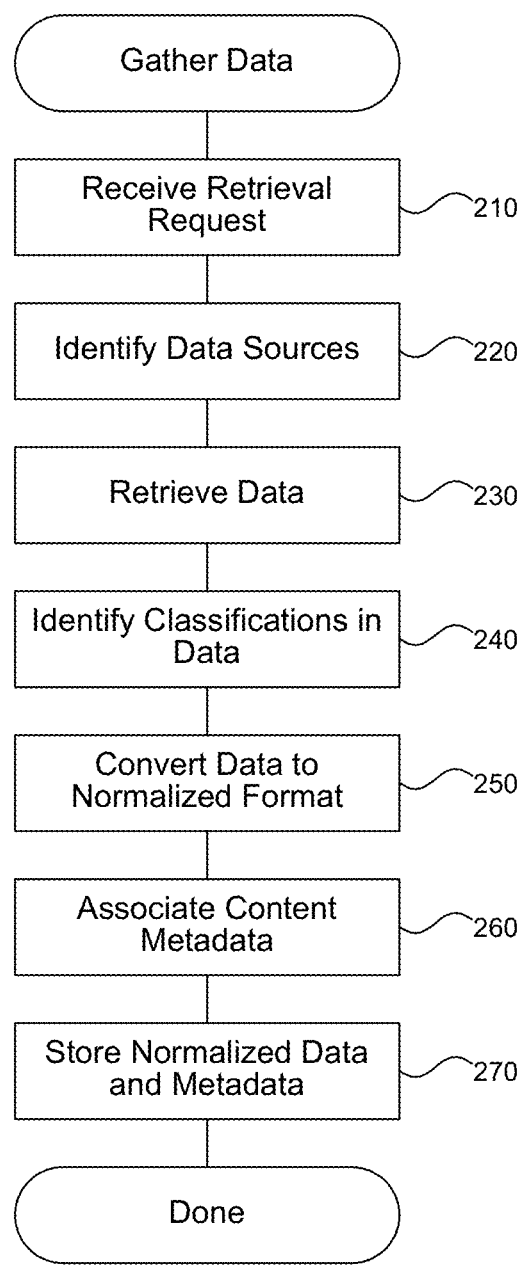
FIG. 2 is a flow diagram that illustrates processing of the content unification system to gather data from various sources in response to a retrieval request, in one embodiment.

FIG. 2 is a flow diagram that illustrates processing of the content unification system to gather data from various sources in response to a retrieval request, in one embodiment. Beginning in block 210, the system receives a request to retrieve data related to a particular classification. For example, a user may visit a web page associated with a tagboard based on a particular hashtag occurring within data from multiple websites and other data sources. When the user visits the web page, the system attempts to retrieve new data from various data sources. The system may also initiate its own automatic request to retrieve data for a popular data classification.

Continuing in block 220, the system identifies one or more data sources from which to retrieve data to satisfy the request to retrieve data. The system may be configured to visit specific sites, such as Twitter, Facebook, Instagram, Google+, and others, or may use well known crawling and search techniques to identify relevant data across a wide variety of network accessible resources. For each data source, the system determines a URL or other identifier that indicates how the data source can be accessed to retrieve data. The system may also identify a data provider software library associated with each data source that the system will invoke to retrieve the data and perform source-specific handling for each data source.

Continuing in block 230, the system retrieves data from each of the identified data sources, wherein the data includes content potentially related to the particular classification identified in the request. The system may retrieve data by invoking an API provided by the data source, using web scraping techniques, or performing other techniques to identify and gather data from the various identified data sources. The data may include various types of content, such as text, audio, video, images, or other content types. The data may also include associated information, such as data classifications (e.g., hashtags), timestamps associated with the data, geographical data, an author associated with the data, information for responding to or interacting with the data, and so forth. In some embodiments, the system intercepts a retrieval request before retrieving data from the data sources, and instead short circuits the process by relying on previously retrieved data. This may occur, for example, where two requests for the same data are received in a short period of time, such that the first response is sufficient to respond to both requests without retrieving the data over again.

Continuing in block 240, the system identifies one or more classifications associated with the retrieved data. In the case of hashtags, the system may perform a text search to look for the pound sign "#" or other identifiers within the text. For some data sources, data classification may be more direct, such as an online forum site that organizes data by topic into various forums. A data provider software library associated with each data source includes source-specific software logic for retrieving data from the data source and identifying classifications associated with the retrieved data.

Continuing in block 250, the system converts the retrieved data to a normalized format by removing information from the data that affects redisplay of the data. For example, the system may remove HTML, CSS, or other instructions within the data, leaving only text, basic formatting, or other acceptable instructions. The system is designed to redisplay data retrieved from the data source in a user interface other than the original. Thus, the type of actions needed to normalize the retrieved data may depend on a specific instance of the system and the goals of that instance for redisplaying the data. The system may perform other types of normalization in addition to formatting, such as removing bad words or other offensive content, eliminating wordiness or otherwise truncating content, and so on.

Continuing in block 260, the system associates metadata with each retrieved data item that describes which data source each data item originated from and one or more data classifications identified as associated with each data item. The system may also associate additional metadata with each retrieved data item, such as a time or location the data item was posted, who authored the data item, and so forth. The metadata allows for efficient retrieval of data items according to a variety of potential axes of inquiry. For example, a request to identify items posted by a particular author or having a particular classification can be better facilitated by separating and storing that information from the outset where it can be indexed and searched when it is needed. The metadata may also contain interaction information that indicates what actions are valid for interacting with a particular data item. For example, the method of responding to a data item may vary based on the data source from which the data item was retrieved (e.g., responding to a tweet from Twitter is performed differently from responding to a Facebook status update or a forum post).

Continuing in block 270, the system stores the normalized data and associated metadata in a data store for subsequent retrieval. The data store may include a database or other data storage model that allows rich retrieval of data, such as queries or other structured retrieval. The data store provides a uniform way of storing data gathered from a wide variety of data sources. The retrieved data may have originated in a variety of formats but is stored in the data store in a uniform format that allows for efficient redisplay of any stored data item regardless of the data source from which the data item originated. After block 270, these steps conclude.

Figure 3:
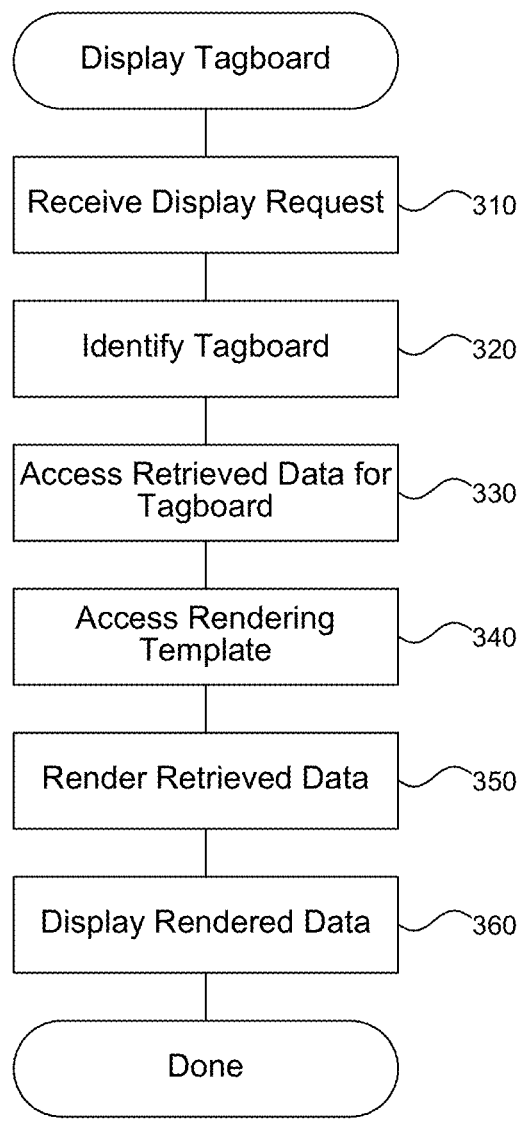
FIG. 3 is a flow diagram that illustrates processing of the content unification system to display data requested by a user, in one embodiment.

FIG. 3 is a flow diagram that illustrates processing of the content unification system to display data requested by a user, in one embodiment. Beginning in block 310, the system receives a request to display data associated with a specified data classification. For example, a user visiting a website associated with the system may specify a hashtag or other data classification for which the user wants to display associated data. Alternatively or additionally, the user may search for a topic by typing a text-based query in a search box, which is converted into a data classification associated with the user's search.

Continuing in block 320, the system identifies a tagboard that aggregates data items associated with the specified data classification. The tagboard includes data stored by the system for rendering the tagboard, and may also include other information, such as which users can edit the tagboard. The tagboard data stored by the system may include an icon or other visual identifier, a description, background color, data sources to retrieve from, and other data to be displayed with data items when the tagboard is displayed. If the system cannot identify an existing tagboard associated with the specified data classification, then the system may display a default tagboard and allow the user to create a tagboard for the specified data classification.

Continuing in block 330, the system accesses previously retrieved data items associated with the specified data classification. The data items may be retrieved by a process such as that described with reference to FIG. 2 and may be stored in a data store associated with the system. In some embodiments, the data store is organized by data classifications so that requests to retrieve data associated with a specified classification are handled efficiently. The system may also retrieve other data associated with the tagboard, such as a description and other general information to be displayed with the tagboard.

Continuing in block 340, the system accesses a rendering template associated with the identified tagboard. The rendering template specifies a format in which to render retrieved data items. For example, the system may offer various views, such as a list view, grid view, or other views that display data items in various positions and with various behaviors on the user's display. In some embodiments, the system provides a brand owner or other owner of a tagboard the opportunity to define the visual experience for users visiting the tagboard. The owner may set a default view, define the layout of the tagboard, provide a description and image associated with the tagboard, and so on. This allows tagboard owners to define the experience in a manner that is consistent with the owner's goals, and that improves the experience from the owner's point of view versus that of the original data sources. In some embodiments, the system provides an administrative tool that allows tagboard owners to provide the tagboard defining information described herein. For example, the system may provide one or more web pages that tagboard owners can access for editing tagboard definitions.

Continuing in block 350, the system renders the previously retrieved data items in accordance with the accessed rendering template. The system stores retrieved data items in a manner that makes the data items easy to quickly redisplay. The system processes incoming data items to remove any formatting or other characteristics that would interfere with redisplay of the data items. The system places each retrieved item on a tagboard page in accordance with position, formatting, and other information in the rendering template. For example, in a grid view, the system renders data items from left to right and top to bottom in an n-by-n grid of a specified size. The system may automatically determine the size based on the user's display resolution and other characteristics of the user's viewing environment. The system may also retrieve and display media, such as photos, video, embedded files, or other types of content referenced within the items (e.g., inline media).

Continuing in block 360, the system displays the rendered data to a requestor. The requestor may be using any of a variety of client devices, such as televisions, mobile phones, tablet computers, desktop computers, laptop computers, kiosks, digital signage, and so forth. The requestor may also be using any of a variety of operating environments, such as a web browser, dedicated application, or other environment. The system renders and displays the data based on the user's device and associated operating environment. For example, the system may opt to display a smaller grid view on a smartphone than on a desktop computer. After block 360, these steps conclude.

Figure 4:
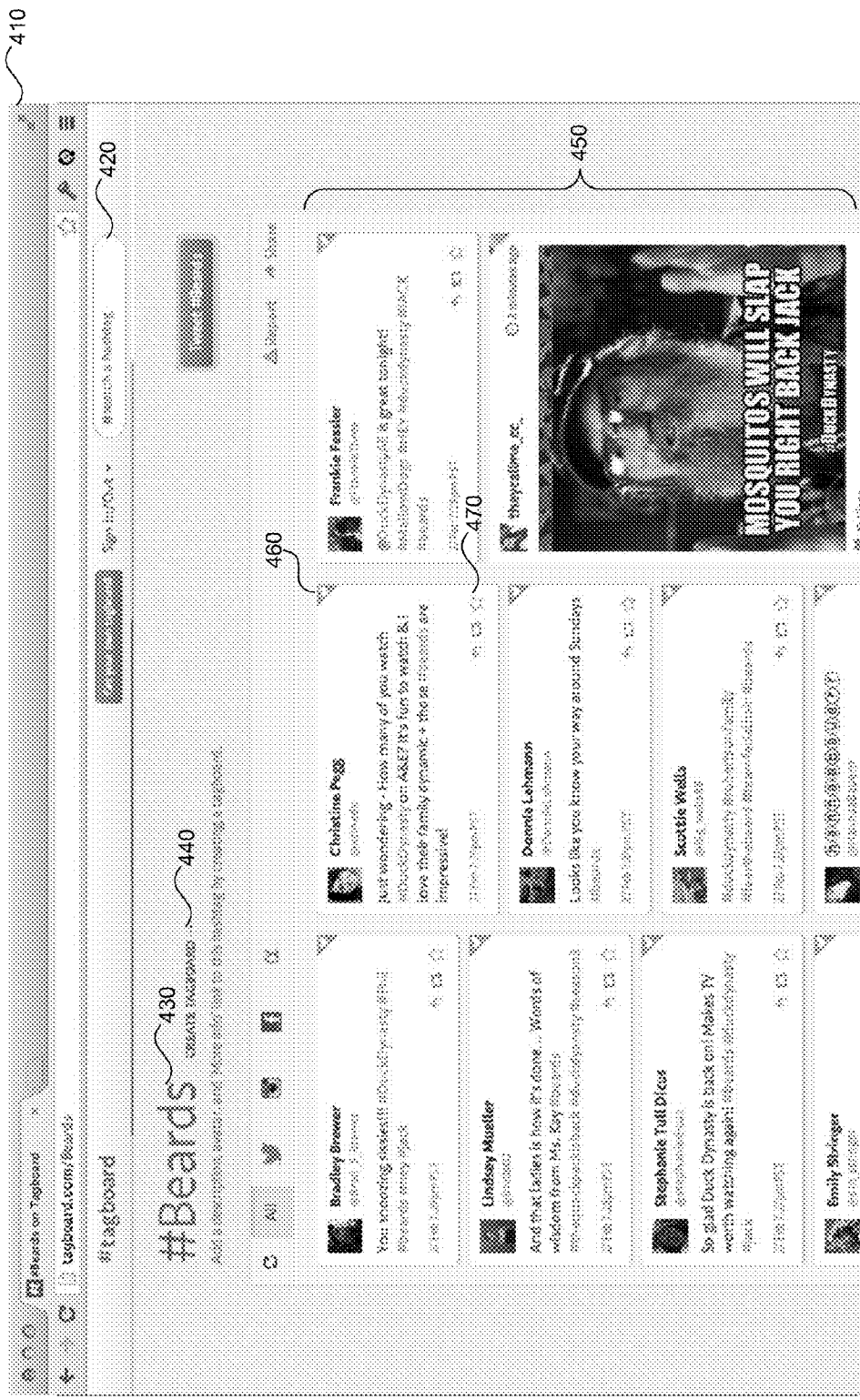
FIG. 4 is a display diagram that illustrates a grid view produced by the content unification system, in one embodiment.

FIG. 4 is a display diagram that illustrates a grid view produced by the content unification system, in one embodiment. The display 410 includes a search box 420 in which a user can enter a search query to find a tagboard. In the illustrated case, the user searched for "beards" and received the tagboard 430 associated with the "#beards" hashtag. Because no tagboard existed for that hashtag, the display includes a control 440 for the user to create a new tagboard for the hashtag. The display 410 also includes a grid view 450 of data items arranged horizontally and vertically across the page. Each display item includes an indication 460 of the data source from which the display item originated as well as any interaction controls 470 associated with the display item. Thus, users are able to view display items aggregated from a variety of data sources, but are also able to have rich interactions with the items.

The following paragraphs describe the content unification system at an architectural level.

The Data Provider Layer (DPL) abstracts the consumption of content and metadata (where content and metadata are grouped together as "data" for the remainder of this document), where specific implementations of the abstraction handle the mechanisms by which data is acquired according to the standards associated with the provider's external application programming interfaces (APIs) or storage medium. For example, the system may provide separate providers for services like Twitter, Facebook, well-known blog formats, and so forth. The system may also publish an extensible interface through which content providers and third parties can extend the system with new data providers for consuming their content.

In some embodiments, the system is implemented without a heavyweight DPL, and the CTE incorporates a DPL-like abstraction without a separate DPL. Within such a system, relationships between message content is fluid and dynamic when displayed and can optionally be graphed into the "official" conversation through user intervention or tagboard-specific settings that automate such intervention.

Data may be acquired through push or pull mechanisms, and the format of the data may be freeform or well defined. The amount of data pushed by an individual data provider may be very high, so internal tools exist that abstract implementation details associated with the high availability and scalability of data acquisition, making the creation of new data providers easier.

Each data provider has a distinguished way of representing explicit metadata within the stream itself. As an example, Twitter feeds have metadata embedded within the content through the use of hashtags while data provided by WordPress has a secondary stream that contains explicit tags selected by the content author when creating the content). The data provider layer processes this information, enqueues the information for extraction, and makes the results available to the content and tag engine described further herein.

The Content and Tag Engine (CTE) persists data provided by the Data Provider Layer using a scalable and secure data store. The system may leverage file systems, databases, cloud-based storage services, or other storage facilities (or combinations thereof) for the data store. Additionally, this layer performs notifications and data association, described below.

The system provides notifications when new data is available. Once persisted, data associated with interested listeners is pushed to a well-defined interface, facilitating a pseudo real time notification system.

The system also identifies associations between data. While relationships between content can be inferred based on explicit information contained within the metadata extracted by the Data Provider Layer, there is value associated with the additional relationships that can be extracted using more "fuzzy" heuristics. These relationships require more time and effort to extract and are calculated once the explicit data has been persisted. Much like notifications based on explicit metadata, the system provides notifications for consumption by interested listeners when new relationships are calculated.

Layers dependent upon services provided by the Content and Tag Engine (and indirectly the Data Provider Layer), exercise that functionality based on a well-defined Data API. This API may be publicly exposed in whole or in logical parts to allow third parties to consume and process data gathered and identified by the system.

The Distribution Engine exposes relational information about content and metadata in a way that can be consumed by different experience paradigms. Within those paradigms, fine-grained permissions are applied based on a variety of real-time factors including (but not limited to) tagboard, site, network, content author, and reader permissions. The performance requirements of these activities are high; therefore, the system can distributed the load across a number of different machines to achieve reasonable service levels.

The Conversation API exposes data in terms of message threads and/or discussions, which represent relationships between one piece of content and another, as filtered by the appropriate permissions based on intended use. The information provided by this layer constitutes the building blocks necessary to create different experience paradigms and may or may not be exposed for public consumption. A conversation may include messages originally retrieved from many disparate sources, possibly in different formats.

The following paragraphs describe some of the processes available using the components of the content unification system described herein.

Conversational threads exposed by the Conversation API can be expressed within a number of well-understood, yet radically different experience paradigms, each with their own pre-defined set of actions available to the user. As an example, a conversational thread exposed in a message paradigm displays messages in a linear fashion with the ability to respond to individual messages or the thread itself. The same conversational thread can also be exposed as a question and answer topic, where individual messages can be voted up or down and responses are displayed inline rather than as first-class responses. More exotic experience paradigms may choose to expose the same conversational thread as a mind map, with the core ideas of the original message representing the initially focused node.

As tagboard authors create tagboards and site owners display tagboards, they have the opportunity to select the most appropriate potential experience paradigms for the intended content while specific sites may choose to initially display the tagboard in a specific way. While site-specific customization of the tagboard are possible through the application of brands, the building blocks associated with the experience paradigm itself is provided as out of the box functionality.

Different websites are built using different technologies, each with their own extension points and opportunity for customization. While experience paradigms expose the vast majority of functionality available to a site, experience adaptions make that functionality available to a site owner in a way that is consistent with the functionality leveraged by the site's technology stack. Example experience adaptations include Asynchronous JavaScript and Extensible Markup Language (XML) (AJAX), PHP, Ruby on Rails, Django, and so forth. Experience adaptations allow existing sites to leverage related data from other sources and integrate that data into the format of the site's existing experience.

In its simplest form, tagboard creation is analogous to a specific search query that pushes information to a user over time. However, this analogy does not address a tagboard's goal of stimulating interaction and long-term value to users. Permissions, advertisement revenue distribution, and other factors contribute to make a tagboard distinguishable from all other tagboards, even when compared to a board associated with similar content. A myriad of configuration options is exposed to the user in a digestible way, ensuring that tagboards are easy to create while simultaneously being open to fine-grained customization and persisted for later consumption.

In some embodiments, the content unification system operates on a service model for tagboard owners. For example, the system may charge tagboard owners a setup and/or periodic fee for continued ownership rights to a tagboard. The system may also provide an enterprise-based per-seat model where organizations purchase rights to use the system for a particular number of users. In some embodiments, the system includes advertising, such as display advertising embedded within streams of data items displayed by the system or in other locations associated with user interfaces of the system. The system may also sell aggregated, anonymous usage information.

In some embodiments, the content unification system provides a process for resolving disputes related to tagboard ownership. Just as multiple parties may want to own a particular domain name today, it is possible that multiple parties would like to own and control a particular tagboard. The system may provide for the first person to request a particular tagboard to become its owner, but may also provide other models for determining owners. For example, the system may allow interested parties to bid for a popular tagboard, or for a particular party to request a tagboard under certain circumstances (e.g., the tagboard represents the party's name or company name).

In some embodiments, the content unification system provides a transformative visual mosaic display for displaying content items to users. On the web, the system may display a grid view that fills the screen with content from various data sources, such as social networking and other services. For mobile devices, the system may include a more native interface, with animation and graphics. The system may still display a grid view on mobile devices, although the grid dimensions may be adjusted based on available screen space.

In some embodiments, the content unification system provides an interaction layer under the display layer. When content items are in their original location at the data source from which they were retrieved, there are often interactions associated with the content items, such as sharing the content item, replying, and so on. The system maintains these interactions by storing where a particular content item originated and knowing what interactions are available for the original data source. Thus, users can interact with content items in the ways they are familiar with even when the content items are redisplayed in a user interface provided by the system.

In some embodiments, the content unification system allows a tagboard to be embedded within another site. For example, a university web site may want to embed a tagboard associated with the university, so that visitors to the university web site can participate with the tagboard. These embedded tagboards can be displayed on kiosks or other information displays. Interactions are supported by the engine described herein, so that rich interactions with data items are still available when content items are embedded within other sites. Thus, the system provides a single-source social media platform that website authors can incorporate to aggregate all of the available data related to a particular data classification, without understanding or knowing about all of the possible sources for that data.

The following paragraphs summarize some of the valuable contributions of the content unification system that are not available in previous systems.

The Data Provider Layer provides tag extraction. Explicit tags can be extracted from a specific data provider in a way that is consistent with the provider itself. These tags are then made available to the Content and Tag Engine in a uniform way, ensuring that tags associated with different data providers are processed and modified in a unified way.

The Content and Tag Engine provides the ability to infer user intent and meaning based on attributes not explicitly contained within the data. An example of such tags is the application of user intent based on input medium, response time, relative input speed, vocabulary, or location. In addition, algorithms can derive the "value" of a response based on social relationships or other factors. Information consumed by the Content and Tag Engine can come from any number of data sources, as made available by the DPL.

The Content and Tag Engine also provides a dynamic schema. The system supports an ability to dynamically apply a schema upon disparate metadata while ensuring that the metadata is well formed with respect to the schema. As an example, a schema called "Full Name" may require a valid First and Last name. Attempts to apply this schema to a collection of metadata will only be successful if the collection contains data that likely corresponds to each of the required elements. Collections not conforming to the schema still have value, but use targeted algorithms and processing.

The system provides a notion of temporal schemas. A schema that is valid today may not be valid as written tomorrow. For example, a schema applied to a collection of metadata to determine "goodness" may have interpreted "bad" to mean not good when written 30 years ago but may be entirely different today as slang has given a positive meaning to "bad" in some contexts. Cultural themes and memes display similar characteristics in that their meaning changes over time. The system includes schemas with temporal awareness, so they are applied to standards as they exist today and changes that take place tomorrow.

The Distribution Engine creates conversational threads across data from many sources. The ability to unify messages distributed across different data providers into logical threads is a point of value of the system. Data made available via a data provider may or may not contain explicit reference to other data within the logical thread, so relationships are sometimes explicit and sometimes implied.

In some embodiments, the system provides a "tag markup language" that can be used by third parties to create dynamic tagboards. For example, these queries may be made available with a SQL-like language.

Experience paradigms are dynamic, and the system provides an ability to dynamically apply different experience paradigms to individual conversational threads based on tab board, site, and/or user settings. The application of different paradigms may also illuminate contextual relationships (through animation and transition) valuable to the end user.

The system provides an ability to display different advertisements in different ways based on the currently selected experience paradigm. For example, inline ads may be appropriate for message-based paradigms but not appropriate for mind-map paradigms. Ads can be based on the conversational thread, or specific pieces of content within a single message. Different ads may be associated with the same piece of content depending on time, display site, current trends, and so on.

The system may provide various methods of distribution of advertisement revenue to (but not limited to) tagboard owner, site owner, content author, author medium, and so forth. The system also provides an ability for a tagboard owner and/or site owner to dynamically adjust advertisement revenue percentages to encourage participation across different sites and mediums. In other words, distribution percentages can be modified in real time to differentiate consumption across different environments.

In some embodiments, the content unification system provides real-time feedback. The system allows brand-owners to monitor real-time conversations and trends in an attempt to participate and shape the conversation as it is happening, no matter where the conversation is happening.

In some embodiments, the system provides for the extraction and application of metadata from voice content and the ability to integrate that content into online conversations. Likewise, the system provides for the extraction and application of metadata from video content and the ability to integrate that content into online conversations.

From the foregoing, it will be appreciated that specific embodiments of the content unification system have been described herein for purposes of illustration, but that various modifications may be made without deviating from the spirit and scope of the invention. Accordingly, the invention is not limited except as by the appended claims. The order of inventorship is alphabetical and is not intended to indicate any relative level of contribution.

We claim:

1. A computer-implemented method in a content unification system to gather data from various sources in response to a retrieval request, the method comprising:
   receiving a request to retrieve data related to a particular data classification;
   identifying one or more data sources from which to retrieve data to satisfy the request to retrieve data;
   retrieving data from each of the identified data sources, wherein the data includes content potentially related to the particular classification identified in the request;
   identifying one or more classifications associated with the retrieved data;
   converting the retrieved data to a normalized format by removing information from the data that affects redisplay of the data;
   associating metadata with each retrieved data item that describes which data source each data item originated from and one or more data classifications identified as associated with each data item; and
   storing the normalized data and associated metadata in a data store for subsequent retrieval,
   wherein the preceding steps are performed by at least one processor.

2. The method of claim 1 wherein receiving the request comprises determining that a user visited a web page associated with a particular hashtag occurring within data from multiple websites.

3. The method of claim 1 wherein receiving the request comprises the system initiating its own automatic request to retrieve data for a popular data classification.

4. The method of claim 1 wherein identifying data sources comprises accessing configuration information that specifies one or more specific web sites containing data to retrieve.

5. The method of claim 1 wherein identifying data sources comprises determining a uniform resource locator (URL) for each data source that indicates how the data source can be accessed to retrieve data.

6. The method of claim 1 wherein identifying data sources comprises identifying a data provider software library associated with each data source that the system will invoke to retrieve the data and perform source-specific handling for each data source.

7. The method of claim 1 wherein retrieving data comprises invoking an application programming interface (API) provided by each data source to identify and gather data from the identified data sources.

8. The method of claim 1 wherein retrieving data comprises retrieving associated information, including at least one of data classifications, timestamps associated with the data, geographical data, an author associated with the data, and information for interacting with the data.

9. The method of claim 1 wherein retrieving data comprises intercepting a retrieval request before retrieving data from the data sources, and accessing locally stored, previously cached data instead.

10. The method of claim 1 wherein identifying one or more classifications comprises performing a text search of the retrieved data to identify one or more hashtags embedded within the data.

11. The method of claim 1 wherein converting the retrieved data comprises removing select markup instructions within the data.

12. The method of claim 1 wherein converting the retrieved data produces a uniform set of data that can be redisplayed in the same way regardless of the original data source from which each data item is retrieved.

13. The method of claim 1 wherein associating metadata comprises associating one or more of a time a data item was posted, a location the data item was posted, and who authored the data item.

14. The method of claim 1 wherein associating metadata comprises adding metadata that contains interaction information that indicates what actions are valid for interacting with a particular data item.

15. The method of claim 1 wherein storing the normalized data comprises storing retrieved data that originated in a variety of formats and from multiple data sources and storing the data in the data store in a uniform format that allows for efficient redisplay of any stored data item regardless of the format and data source from which the data item originated.

* * * * *